United States Patent [19]

Nezworski

[11] 4,291,821

[45] Sep. 29, 1981

[54] KEG TAPPING SYSTEM UNIT AND VALVE INTERLOCK

[75] Inventor: James E. Nezworski, Milwaukee, Wis.

[73] Assignee: The Perlick Company, Inc., Milwaukee, Wis.

[21] Appl. No.: 81,670

[22] Filed: Oct. 4, 1979

[51] Int. Cl.[3] .......................... F16K 35/00; F16L 37/24

[52] U.S. Cl. .................................. 222/153; 222/400.7; 137/212; 137/322; 251/89.5

[58] Field of Search ............................ 222/400.7, 153; 251/89.5; 137/322, 212

[56] References Cited

U.S. PATENT DOCUMENTS 4,159,102 6/1979 Fallon et al. ................. 222/400.7 X

*Primary Examiner*—Robert J. Spar
*Assistant Examiner*—Frederick R. Handren
*Attorney, Agent, or Firm*—James E. Nilles; James R. Custin

[57] ABSTRACT

In a keg tapping system, a keg unit in each keg has coaxial gas and liquid valves, and a tavern unit, detachably connectable to the keg unit, has a lever actuated plunger that is depressed to open the valves in the keg unit and to open a gas valve in the tavern unit. The keg unit has a well in its top in which the tavern unit is rotatably received and diametrically opposite lugs projecting into that well to cooperate with a flange on the tavern unit body in providing a bayonet connection between the units. Affixed to the lever on the tavern unit is an abutment carrier having abutment portions cooperable with said lugs. If the bayonet connection is not fully engaged, one abutment portion engages an upper surface on one of the lugs to prevent the lever from being swung down to its valve-open position; with the lever down, an abutment portion engages a lug to prevent rotation of the tavern unit to a position at which the bayonet connection is disengaged.

4 Claims, 6 Drawing Figures

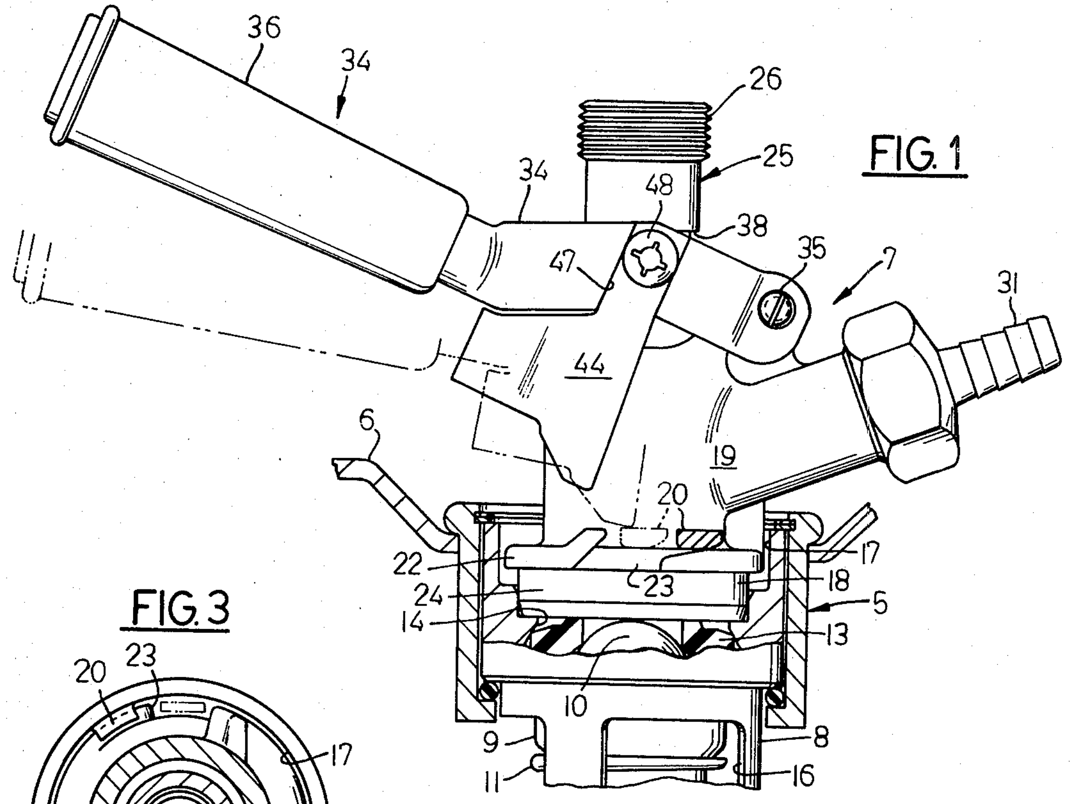
FIG. 1
FIG. 3
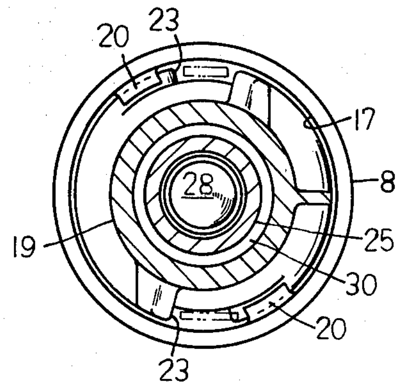
FIG. 2
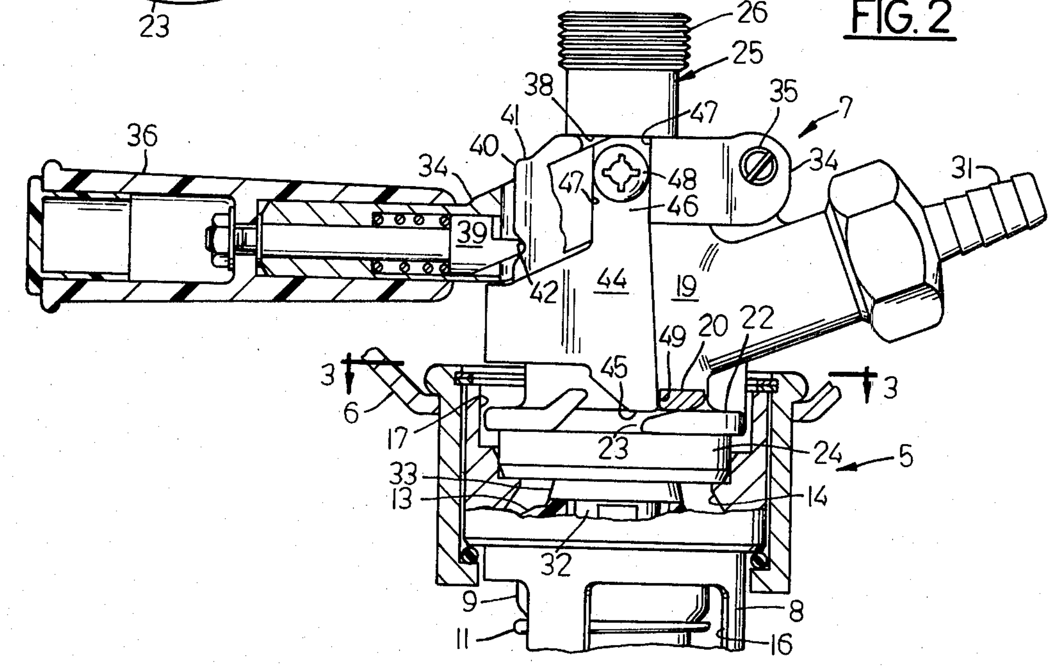

KEG TAPPING SYSTEM UNIT AND VALVE INTERLOCK

FIELD OF THE INVENTION

This invention relates to keg tapping systems of the type that comprise a tavern unit to which a beverage duct and a pressure gas duct are normally connected and a keg unit that is installed in a keg and to which the tavern unit is readily detachably connectable; and the invention is more particularly concerned with a keg tapping system wherein the tavern unit and the keg unit have cooperating parts that provide a bayonet connection between them and wherein the tavern unit has a lever that facilitates its bodily rotation for establishing and disengaging the bayonet connection, which lever also serves as a valve actuator that is swung down after the bayonet connection is established, to communicate the interior of the keg with said ducts, and is swung up before the units are separated from one another, to prevent loss of gas and beverage. Specifically, the invention relates to means for preventing the valve actuating lever from being swung to its valve open position before the bayonet connection is fully established and for preventing separation of the units until the lever is in its raised valve-closing position.

BACKGROUND OF THE PRIOR ART

In the widely used keg tapping systems of the general type to which this invention relates, each keg is fitted with a keg unit that is seated in its bung hole and comprises a normally closed valve having a plunger-like valve element. The upper portion of the keg unit body is formed with an upwardly opening well, and the body of the tavern unit has a base portion which is so formed as to be rotatably receivable in the well in the keg unit and to provide a bayonet connection with the keg unit. Rotation of the tavern unit to establish and disengage the bayonet connection is facilitated by a lever that projects generally radially from the body of the tavern unit.

Normally, a pressure gas duct and a beverage duct are connected to the tavern unit, and they remain connected to it as the tavern unit is taken off of an empty keg and connected to a full one. The gas duct extends to the tavern unit from a tank charged with pressurized gas, usually carbon dioxide. The beverage duct extends from the tavern unit to a tap at which the beverage is dispensed. When the tavern unit is not connected to a keg unit, a plunger-like valve element in the tavern unit body is normally in a raised position in which it closes the gas duct to prevent loss of pressure gas, while a check valve in that body prevents loss of beverage from the beverage line.

The lever on the tavern unit, which is swingable up and down relative to the body of that unit, serves as an actuator for its plunger-like valve element. When the lever is in a raised position the gas valve is closed. After the bayonet connection between the tavern unit and a keg unit has been fully engaged, the lever is swung down to depress the plunger-like valve element in the tavern unit body, thus opening the gas valve. The lower portion of the tavern unit valve element serves as a probe or pusher that engages the top of the plunger-like valve element in the keg unit; and therefore downward movement of the lever on the tavern unit also effects opening of the valve in the keg unit. With the valves thus opened, pressure gas flows through the connected units and into the top of the keg. Inside the keg is a tube that extends down from the keg unit to near the bottom of the keg, and gas pressure forces beverage up through that tube and the connected keg and tavern units, into the beverage duct.

Heretofore the tavern unit in a system of this type has been so arranged that it was possible to depress the valve actuator lever when the bayonet connection between the units was not fully established and to disengage the bayonet connection with the lever in its lowered, valve-open position. In either case, beverage squirted out of the keg around the loose or incomplete connection between the units, and gas freely escaped through the open gas valve in the tavern unit. In addition to the loss of gas and beverage, this leakage entailed the cost and inconvenience of cleaning up the keg storage cooler and usually involved a change of clothing for the person who had been manipulating the tavern unit.

Such occurrences, although perhaps not frequent, were by no means rare. Perhaps it has not heretofore been obvious that there is a need for an expedient which will prevent such accidents, especially since they always seemed to be preventable with reasonable care and the penalty for carelessness was nothing worse than a mess.

But if the art recognized the desirability of providing some expedient for enforcing coordinated manipulation of the bayonet connection and the valve actuator, the nature of that expedient was by no means obvious. There is no point in preventing an infrequent and relatively minor mishap if the cost of such prevention is substantially greater than the cost of the accident, or if the preventative means introduces a new set of problems. Obviously, control systems technology could suggest various sensing and lockout arrangements that would perform the necessary function but would be impractical. Apparatus associated with keg tapping systems must be capable of surviving very rough handling, must not tend to provide lodgings for dirt, must be capable of being readily cleaned, and—notwithstanding these other requirements—must be dependable and inexpensive.

A most important requirement is that any change in the system should be confined to the tavern unit and should not affect the keg unit. This is because any particular dispensing location requires no more than a few tavern units, whereas the cost of any change in the keg unit must be multiplied by the thousands of kegs in which keg units are installed.

Thus the problem to which the present invention is addressed is one that is fairly simple on its face but is in fact involved with many complications and is made all the more complicated by the need for a solution to it that will be extremely simple.

SUMMARY OF THE INVENTION

In general, the object of this invention is to provide means for solving the above described problem, comprising a very simple and inexpensive attachment for a tavern unit of a keg tapping system of the character described, which attachment is cooperable with existing keg units to require full engagement of the bayonet connection between the units before the valves in them are opened and to require closure of those valves before the bayonet connection is disengaged.

Another and more specific object of the invention is to provide means for achieving the general object just stated, comprising a simple stamped part which is secured to the valve actuating lever of the tavern unit and the addition of which requires only minor modification of that lever without further change in the tavern unit or keg unit, and which can be added to existing tavern units at very little cost because, conventionally, the lever on which that part is installed is readily detachably connected to the body of the tavern unit.

In achieving these requirements the invention also fulfills, in the highest possible degree, the further requirements for sturdiness, dependability and easy maintenance of hygienic conditions.

In general, the invention comprises an improvement in the tavern unit of a keg tapping system of the type wherein the tavern unit comprises a body to which a pressure gas duct and a beverage duct are normally connected and which is detachably connectable to a keg unit installed in a keg, and wherein the keg unit has an upwardly opening well into which opposite lugs project radially and the body of the tavern unit has a base portion which is rotatably receivable in said well and which cooperates with said lugs to provide a bayonet connection between said units, said tavern unit also having a lever projecting substantially radially from its body, above said base portion, whereby the tavern unit can be bodily rotated for engagement and disengagement of said bayonet connection, said lever also comprising a valve actuator that is swingable relative to the body downward to a valve open position providing for communication between the interior of said keg and said ducts and upward to a valve closed position that permits separation of the units without loss of gas or beverage. The tavern unit of this invention is characterized by abutment means carried by said lever for up and down motion therewith and projecting downward from said lever, towards said base portion, said abutment means being arranged for cooperation with one of said lugs on a keg unit to prevent the lever from swinging down to its valve open position when said bayonet connection is not fully engaged and to prevent disengagement of said bayonet connection when said lever is in its valve open position.

BRIEF DESCRIPTION OF THE DRAWINGS

In the accompanying drawings, which illustrate what is now regarded as a preferred embodiment of the invention:

FIG. 1 is a view in side elevation of a tavern unit that embodies the principles of this invention, shown in assembled relation to a keg unit with which it is intended to cooperate and with its valve actuating lever in its raised, valve-closed position;

FIG. 2 is a view generally similar to FIG. 1 but showing the tavern unit in fully connected relation to the keg unit;

FIG. 3 is a view in transverse section taken on the plane of the line 3—3 in FIG. 2;

DETAILED DESCRIPTION OF PREFERRED EMBODIMENT OF THE INVENTION

Referring now to the accompanying drawings, a keg tapping system of the type to which this invention relates comprises a keg unit 5 which is installed in a keg 6, and a tavern unit 7 which is intended to be detachably connected to the keg unit 5 to provide for dispensing the contents of the keg.

The keg unit 5 is conventional and well known; hence it will not be described except to draw attention to such of its features as are related to the present invention.

Figure 5:
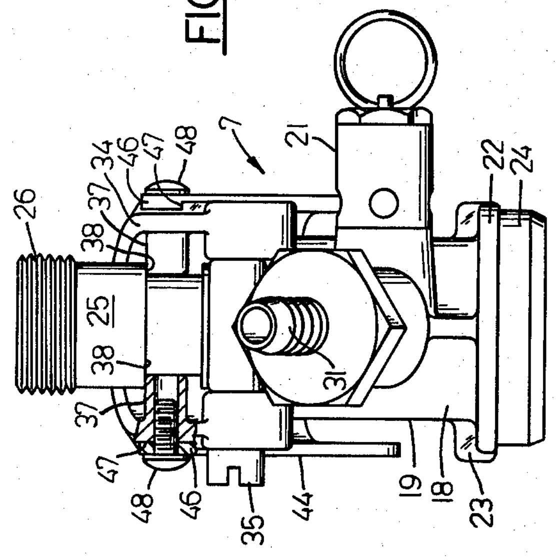
FIG. 5 is a view in elevation of the tavern unit as seen from the right-hand side of FIG. 2.
Figure 6:
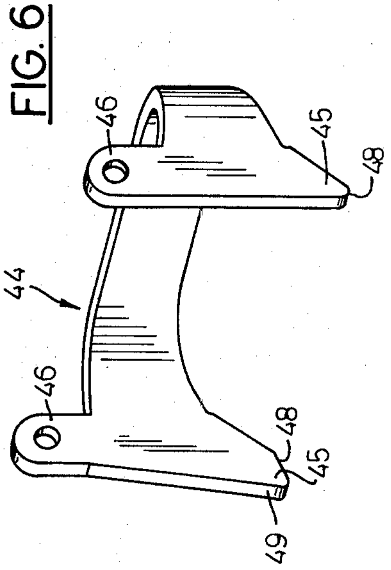
FIG. 6 is a perspective view of the abutment member per se of this invention.
Figure 4:
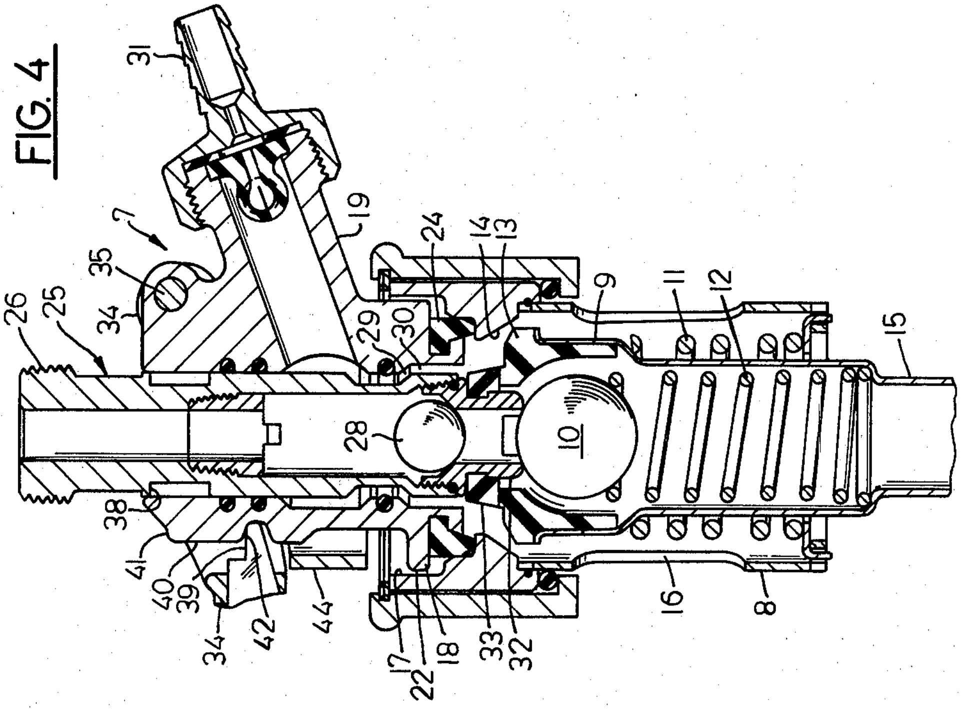
FIG. 4 is a view in vertical section showing the tavern and keg units in the fully connected relationship illustrated in FIG. 2.

Coaxially slidable in the body 8 of the keg unit is an annular gas valve 9 (see FIG. 4) which has a tubular stem portion within which a liquid valve 10 is coaxially movable. A relatively stiff coiled spring 11 surrounding the gas valve 9 biases it upwardly towards a seated position, while a lighter coiled spring 12 within the gas valve 9 urges the liquid valve 10 upwardly towards a seated position. The head 13 of the gas valve 9 comprises a resilient annular member that provides, at its underside, a seat for the liquid valve 10 and also serves as the valve element proper of the gas valve 9, seating against a coaxial annular shoulder 14 in the keg unit body. At its lower end the tubular stem portion of the gas valve is connected to a tube 15 that extends down to near the bottom of the keg 6, and the interior of that tubular stem portion thus provides a liquid passage through the keg unit 5 that is controlled by the liquid valve 10. When the gas valve 9 is unseated, gas passes around its head 13 and enters the top of the keg 6 through rather large ports 16 in the body 9 of the keg unit.

The upper portion of the keg unit body 8 is formed to define a concentric upwardly opening well 17 in which a base portion 18 of the body 19 of the tavern unit 7 is rotatably receivable. The bottom of the well 17 is conjointly defined by the shoulder 14 in the keg unit body, the annular head 13 of the gas valve, and the liquid valve 10. When the gas valve 9 and the liquid valve 10 are seated, their upper surfaces are substantially coplanar with the upper surface of the shoulder 14 in the keg unit body.

Projecting radially into the well 17 from diametrically opposite sides of its rim are lugs 20 that cooperate with the tavern unit 7 to provide a bayonet connection between it and the keg unit 5, which connection is engaged and disengaged by rotating the tavern unit relative to the keg unit.

The tavern unit 7, like the keg unit 5, is conventional in most respects. The base portion 18 of its body 19 comprises a flange 22 in which there are opposite notches 23 to receive the lugs 20 on the keg unit, and said flange 22 is so formed as to cooperate with the lugs 20 in providing the bayonet connection between the units 5 and 7. The tavern unit base portion 18 also comprises a concentric annular gasket 24 which underlies the flange 22 and which, when the units 5 and 7 are connected, engages the top surface of the shoulder 14 in the keg unit body to provide a gas seal between the units.

The tavern unit body 19 also comprises an obliquely upwardly projecting nipple 31 to which a pressure gas duct is normally connected. A safety valve 21 projects sidewardly from that nipple to relieve excessive gas pressures.

Slidable up and down in a concentric bore in the tavern unit body 19 is a tubular plunger 25 that has several functions. In general, the plunger 25 is in a raised position when the tavern unit 7 is not connected with a keg unit 5, but when those units are fully connected it is normally in a lowered position in which it holds open the valves that control flow of gas and liquid between the units 5 and 7.

The interior of the tubular plunger 25 comprises a part of the liquid passage through the connected tavern and keg units. The upper end portion of the plunger 25 projects a substantial distance above the top of the tavern unit body 19 and comprises a nipple 26 to which there is normally connected a beverage duct (not shown) that leads to a dispensing location.

Within the plunger 25 is a buoyant ball check valve 28 that prevents liquid from flowing back out of the beverage duct when the tavern unit 7 is disconnected from the keg unit 5 but permits upward liquid flow through the tavern unit, from a keg to the beverage duct. To provide a seat for the check valve 28, the lowermost portion of the bore in the plunger 25 is of reduced diameter.

Just below the zone where the bore in the gas nipple 31 joins the plunger bore in the tavern unit body, the interior of the tavern unit body is formed to cooperate with the exterior of the plunger 25 in providing a tavern unit gas valve 29 that is closed when the plunger 25 is in a raised position and is open when it is in a lowered position. Thus, with the plunger 25 up, the gas valve 29 prevents escape of pressure gas from the tavern unit 7; and with the plunger 25 down, gas can flow towards the keg unit 5 through an annular gas passage 30 that is conjointly defined by the lower portion of the plunger 25 and of the tavern unit body 19.

When the tavern unit 7 is properly connected to the keg unit 5 and the plunger 25 is lowered, the plunger serves as a probe or pusher that unseats the keg unit gas valve 9 and liquid valve 10. To bear against the head of the poppet-like keg unit liquid valve 10 the plunger 25 has a hard, small diameter slotted bottom portion 32. A little above its bottom end there is coaxially affixed to the plunger 25 a larger diameter resilient sealing ring 33 which bears against the resilient keg unit gas valve head 13 to cooperate with it in defining an annular seal between the inner liquid passage through the connected units 5 and 7 and the annular gas passage 30 that extends through those units in surrounding relation to the liquid passage.

Since the keg unit gas valve 9 and liquid valve 10 are urged towards their seats under rather strong bias, in order to assure a good seal for the untapped keg 6, a substantial force must be exerted upon the plunger 25 of the tavern unit to drive it to its lowered valve-open position when the units 5 and 7 are connected. To facilitate imposition of such downward force upon the plunger 25, it is actuatable by means of a substantially Y-shaped lever 34 that has its bifurcations straddling the tavern unit body 19. The tips of the lever bifurcations have a pivotal connection 35 to the tavern unit body 19, directly above the gas nipple 31. The stem portion of the lever 34, which comprises a handle 36, projects from the tavern unit body 19 at the side thereof opposite the gas nipple 31 and is thus convenient for bodily rotation of the tavern unit 7 to engage and disengage the bayonet connection between it and the keg unit 5. As the handle 36 is swung up or down, it imparts corresponding up or down motion to the plunger 25 by reason of a connection comprising coaxial inwardly projecting bosses 37 on the bifurcations of the lever, spaced from the pivotal connection 35, engaged in a circumferential groove 38 in the plunger.

The lever 34 is releasably maintained in each of its raised and lowered positions by means of a detent pin 39 that is coaxially slidable in the handle portion 36 of the lever, in cooperation with a hump-like boss 40 on the tavern unit body 19 that provides vertically spaced upper and lower abutments 41 and 42. The detent pin 39 is biased axially towards the axis of the tavern unit body 19 and thus engages over the abutment 41 and under the abutment 42 with a marked detent action to define the respective raised and lowered positions of the lever 34. The detent pin 39 is connected with an outer tubular shell on the handle 36, which can be pulled axially outwardly against the biasing force on the detent pin 39 to disengage the detent pin from either abutment 41 or 42 so that the lever 34 can be swung to an opposite position.

Everything described to this point is generally conventional, and it is also conventional that the pivotal connection 35 between the lever 34 and the tavern unit body 19 comprises a single readily removable bolt that enables the lever 34 to be quickly detached so that the plunger 25 can be removed from the body 19 for thorough cleaning of the tavern unit.

According to the present invention there is secured to the lever 34 an abutment carrier 44 that projects downwardly from the bifurcated portion of the lever and has bottom abutment portions 45 that are at diametrically opposite sides of the axis of the tavern unit 7 and are arranged to cooperate with the lugs 20 on the keg unit. If (as illustrated in broken lines in FIG. 1) the tavern unit 7 has its base portion 18 in the well 17, but the tavern unit is in such a position of rotation relative to the keg unit 5 that the bayonet connection between the units is not fully engaged, then the abutment portions 45 engage the top surfaces of the lugs 20 and prevent the lever 34 from being swung down to its valve-open position. If the lever 34 is swung down after the bayonet connection is fully engaged, the abutment portions 45 do not interfere with such lever movement and merely position them-selves alongside the lugs 20, as shown in FIG. 2. With the lever 34 in its lowered valve-open position, the tavern unit 7 cannot be disconnected from the keg unit 5 because one of the abutment portions 45 then engages a circumferentially facing surface on its adjacent lug 20 to prevent rotation of the tavern unit.

As shown, the abutment carrier 44 is formed as a one-piece stamping which curves in substantially a semi-circle around the tavern unit body 19 and is fixed directly below the correspondingly curved bight portion of the lever bifurcation, where the abutment carrier serves as a guard or shield around the lever detent mechanism that comprises the projecting end of the detent pin 39 and the hump-like boss 40 on the tavern unit body. At each of its ends the U-shaped abutment carrier 44 has an upwardly projecting leg 46 that provides for its securement to the lever 34 and has a more or less triangular downwardly projecting leg that comprises one of the abutment portions 45. Each of the upwardly projecting legs 46 is received in a shallow slot 47 in the outwardly facing surface of one of the lever bifurcations. The upper ends of the slots 47 intersect the axis of the concentric bosses 37 that comprise the connection between the lever 34 and the plunger 25, and each of those bosses has a threaded concentric bore therethrough in which is received a screw 48 that rigidly secures the abutment element 44 to the lever 34. It will be noted that a heretofore conventional lever 34 can be adapted to the present invention merely by milling the slots 47 therein and drilling and tapping the threaded holes in which the screws 48 are received, the bosses 37 being already present and serving nicely as receptacles for the screws 48.

The downwardly projecting legs 45 that comprise the abutment portions of the abutment element 44 are of triangular shape so that their narrow lower end portions can pass through the lug notches 23 in the flange 22 on the tavern unit body to be receivable between the lugs 20 and the ends of those notches. A small bottom edge portion 48 of each leg 45 provides a downwardly facing abutment engageable with a top surface of a lug 20, and a side edge 49 of one leg provides a circumferentially facing abutment engageable with an opposing surface of a lug 20 to prevent rotation of the tavern unit out of its connection with the keg unit when the lever is down.

The curved, shield-like body of the abutment carrier 44 serves as a convenient thumb support that facilitates the application of axially outward force to the tubular handle member 36 for retraction of the detent pin 39 to permit the lever 34 to be swung from each of its positions to the other.

From the foregoing description, taken with the accompanying drawings, it will be apparent that this invention provides very simple and inexpensive means for preventing the lever on the tavern unit of a conventional keg tapping system from being swung down to its valve open position when the bayonet connection between the tavern unit and a keg unit is not fully engaged and to prevent disengagement of the bayonet connection until that lever is swung up to its valve closed position.

I claim:

1. A tavern unit for a keg tapping system, to which a pressure gas duct and a beverage duct are normally connected and which is detachably connectable to a keg unit that is installed in a keg and has an upwardly opening well into which opposite lugs project radially, said tavern unit having a body with a base portion which is rotatably receivable in said well and which cooperates with said lugs to provide a bayonet connection between said units, said tavern unit also having a lever projecting substantially radially from its body, above said base portion, whereby the tavern unit can be bodily rotated for engagement and disengagement of said bayonet connection, said lever also comprising a valve actuator that is swingable relative to the body downward to a valve open position providing for communication between the interior of said keg and said ducts and upward to a valve closed position that permits separation of the units without loss of gas or beverage, said tavern unit being characterized by: abutment means rigidly fixed to said lever for up and down motion therewith and projecting downwardly from said lever, towards said base portion, said abutment means being arranged for cooperation with one of said lugs on a keg unit and having (1) a downwardly facing abutment at its bottom which is engageable with a top surface on one of said lugs when said bayonet connection is not fully engaged, to prevent the lever from swinging down to its valve open position, and (2) a circumferentially facing abutment which is engageable with an opposing circumferentially facing surface on one of said lugs when said lever is in its lowered valve open position and which thus cooperates with said lug to then prevent rotation of the tavern unit to a position in which said bayonet connection is disengaged.

2. The tavern unit of claim 1 wherein said lever has a bifurcated portion which straddles the body of the tavern unit and which has a pivotal connection to that body at the remote ends of its bifurcations, and wherein a plunger that is coaxially movable in the tavern unit body is connected with said lever by means of a boss on each of said bifurcations, spaced from said pivotal connection and projecting coaxially towards the other boss, and a circumferential groove in said plunger in which said bosses are received, said tavern unit being further characterized by: said abutment means being secured to said lever for movement therewith by means of screws that are substantially coaxially threaded into said bosses.

3. The tavern unit of claim 2 wherein said abutment means comprises:

a substantially U-shaped element partially embracing the body of the tavern unit and having (1) a downwardly projecting leg at each of its opposite ends, each cooperable with one of said lugs, and (2) an upwardly projecting leg at each of its opposite ends, through each of which one of said screws extends.

4. The tavern unit of claim 3 wherein each of said upwardly projecting legs is received in a closely fitting groove in one of said bifurcations, said grooves cooperating with said screws to confine said U-shaped element against movement relative to said lever.

* * * * *